United States Patent [19]

Bomze

[11] Patent Number: 5,242,126
[45] Date of Patent: Sep. 7, 1993

[54] BOTTLE CRUSHER

[76] Inventor: Howard J. Bomze, 40 E. 20th St., New York, N.Y. 10003

[21] Appl. No.: 800,591

[22] Filed: Nov. 27, 1991

[51] Int. Cl.$^5$ ............................................. B02C 13/06
[52] U.S. Cl. .................................. 241/94; 241/278.1; 241/296
[58] Field of Search ................ 241/99, 68, 277, 278.1, 241/279, 296

[56] References Cited

U.S. PATENT DOCUMENTS

| | | |
|---|---|---|
| 2,474,305 | 6/1949 | Craig . |
| 3,640,475 | 2/1972 | Jung et al. . |
| 3,756,520 | 9/1973 | Hughes . |
| 3,814,332 | 6/1974 | Nakao . |
| 3,987,972 | 10/1976 | Gladwin ................................. 241/99 |
| 4,733,826 | 3/1988 | Komori et al. . |

Primary Examiner—Douglas D. Watts
Attorney, Agent, or Firm—Darby & Darby

[57] ABSTRACT

A bottle crushing machine having a feed chamber, at the bottom of which is located a crusher disk. The disk includes a set of beater bars extending upward into the feed chamber to intercept falling bottles and initially shatter them. Near the surface of the disk are cross bars that further crush the glass fragments. The disk is situated in a portion of the feed chamber under the upper surface of an expanded portion of the chamber. The only route for glass fragments to exit the chamber is between the disk and the upper surface of the expanded portion, between the side walls of the expanded portion and the outer edge of the disk, to an area below the disk. By relative movement of the disk in the vertical direction, the gap between the disk and the upper surface will be varied, adjusting the size of fragments that are created.

17 Claims, 6 Drawing Sheets

BOTTLE CRUSHER

FIELD OF THE INVENTION

This invention relates generally to comminution devices. More specifically, this invention relates to a machine for reducing the volume of glass bottles by shattering them into smaller, safer pieces.

BACKGROUND OF THE INVENTION

Glass has long been known as one of the most recyclable materials for containers. Glass bottles have been returned for re-use or recycling since their inception. When shipping large volumes of stacked or loosely packed empty glass bottles to a reprocessing plant, large amounts of air are shipped with them. This resulting increase in the volume of goods moved, over the volume of actual glass, multiplies freight costs. By crushing the bottles into small fragments, known as comminution, the overall volume of shipped bottles approaches that of only the glass itself.

Of course, breaking bottles manually is a difficult and dangerous task, so devices have been designed for automatically crushing bottles. As more states adopt bottle deposit laws and recycling becomes more widespread, the need for simple, effective and inexpensive machines to perform the bottle crushing has become greater.

Problems that have plagued earlier machines include the ability to quickly reduce a bottle to safe size fragments while guaranteeing that no large fragments survive the process and threaten any subsequent handler of the fragments. If a large fragment survives, the edges of its facets can become knives, potentially cutting not only the sack or container holding the fragments, but the operator who must move that sack. To date, only complex and expensive machines have managed to fulfill this need, such as that disclosed in U.S. Pat. No. 4,733,826 of Komori et al.

It is thus an object of the present invention to provide a bottle crushing machine that can quickly reduce bottles to fragments smaller than a selected size.

It is a further object of the invention that the bottle crushing machine be quickly and easily adjustable and maintainable.

Another object of the invention is to provide a bottle crushing machine that prevents the release of fine glass dust from the machine avoiding operator contact with the dust, especially the inhaling thereof.

It is a still further object of the invention that the glass fragments be conveniently packaged for disposal and sanitary purposes.

It is yet another object of the invention to form a bottle crushing machine that is simple and cost effective to manufacture.

SUMMARY OF THE INVENTION

In accordance with the foregoing objects, a bottle crushing machine is provided having a feed chamber at the bottom of which is located a crusher disk. The disk includes a set of beater bars extending upward into the feed chamber to intercept falling bottles and initially shatter them. Near the surface of the disk there are cross bars that further crush the glass fragments.

The disk is situated in the interior of the feed chamber under the upper surface of an expanded portion thereof. The only route for glass fragments to exit the chamber is between the disk and the upper surface of the expanded portion of the interior of the chamber, around the outer edge of the disk, to an area below the disk. By relative movement of the disk in the vertical direction, the gap between the disk and the expanded portion will be varied, adjusting the size of fragments that are created.

BRIEF DESCRIPTION OF THE DRAWINGS

The foregoing and other objects and advantages of this invention will become apparent to those skilled in the art upon reading the following detailed description of a preferred embodiment in conjunction with a review of the appended drawings, wherein.

DETAILED DESCRIPTION OF THE PREFERRED EMBODIMENTS

Figure 1:
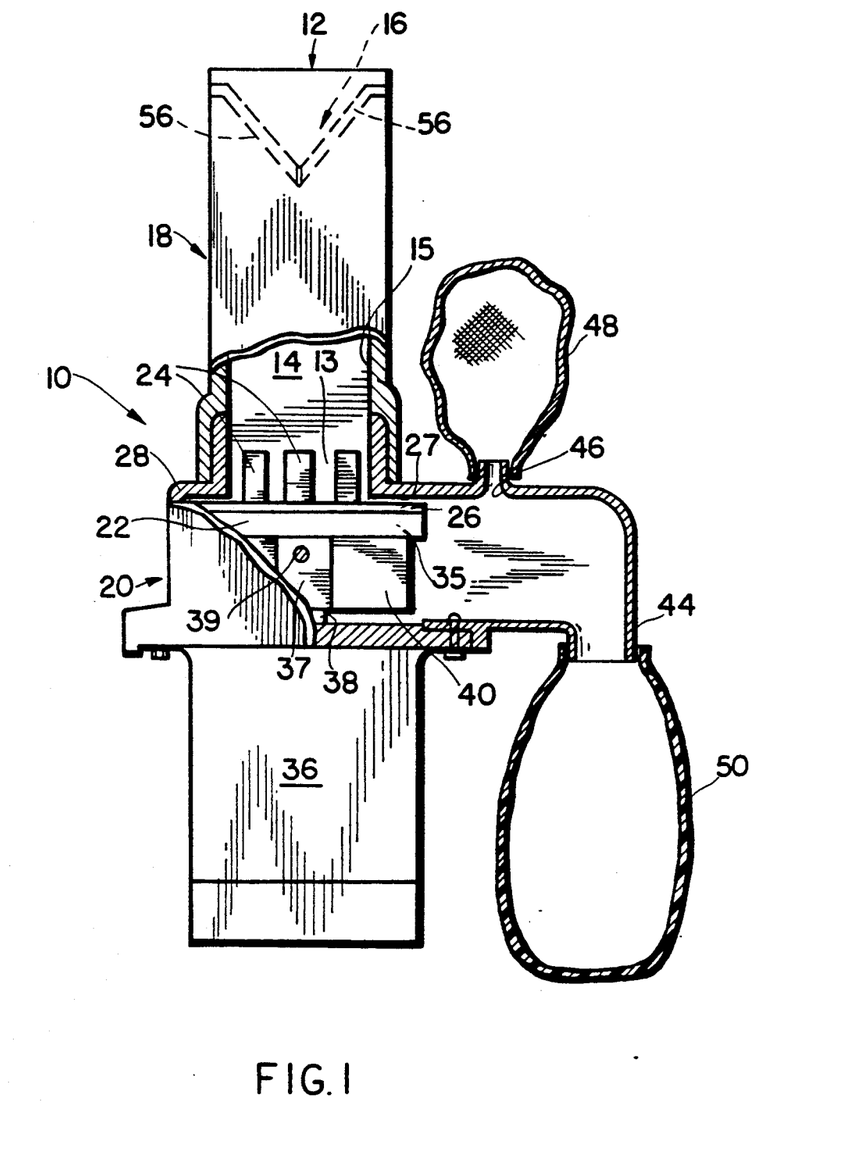
FIG. 1 is a broken side partial cross-sectional view of a bottle crusher machine according to the invention.

Referring now to the drawings, FIG. 1 shows a broken partial cross-section of a bottle crusher 10. Preferably near or at the top of the crusher 10 there is an inlet 12 for receiving bottles (not shown) to be crushed. The inlet 12 leads into a feed chamber 14, which is preferably vertical and cylindrical, although some deviation from vertical, to form a slide, is possible. Covering the inlet 12, preferably from the inside, is a diaphragm 16 for allowing bottles to enter the feed chamber 14, but preventing any glass fragments from being ejected in the reverse direction through the inlet 12. The diaphragm 16 is preferably embodied by two opposing and butting resilient flaps 56 that are separated by a bottle passing through them in the direction shown by the arrows in FIG. 1, but quickly return to butting configuration. Other mechanical devices having the same result will work similarly.

The feed chamber 14 is preferably formed with a rubber upper portion 18 attached to a harder lower portion 20, formed for example, from steel or other metal. The rubber 18 reduces the operating noise level of the crusher 10. The upper portion of the feed chamber is a relatively narrow cylindrical portion 15 and the bottom of the feed chamber has an expanded portion 28.

A crushing disk 22, containing two sets of different crushing elements 24,26, is located just below the upper interior surface 27 of expanded portion 28. Normal to the surface of the disk are beater bars 24 that extend upwardly into the narrow portion 15 of feed chamber 14. Preferably, there are four beater bars 24, positioned at various points on the disk 22, although other configurations will work similarly. Extending parallel to and mounted on the surface of the crushing disk 22 are cross bars 26. In the preferred embodiment, there are two bars 26 that are equal in length to the diameter of the crushing disk 22 and form right angles (see FIGS. 2 and 3). However, again, other numbers, heights, lengths, and configurations of the bars 26 are possible.

The beater bars 24, by extending into and being moved in narrow portion 15, form a shatter or pre-comminuting zone 13. In this zone, the bottles are initially broken into pieces, which may be relatively large. This pre-comminuting zone 13 improves the efficiency of a subsequent comminuting zone 34 by delivery to it of glass pieces that have already been reduced in size.

Figure 3:
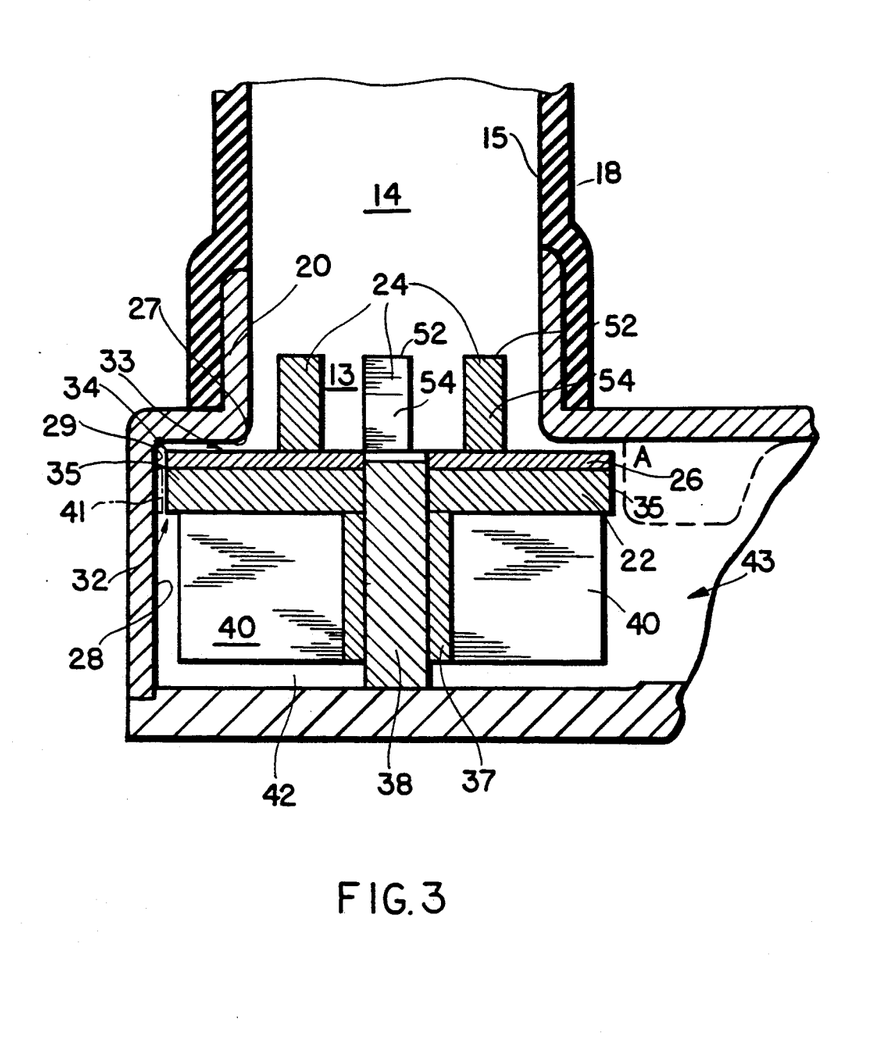
FIG. 3 is a detail cross-sectional view of the crusher disk and feed chamber.

As shown in FIG. 3, the crushing disk 22 preferably has a larger diameter than the narrow upper portion 15 of the feed chamber 14. Consequently, the comminuting zone 34 of the feed chamber 14 is defined by the upper surface 27 and the side walls 29 of expanded portion 28 that are opposite the outer edge 35 of disk 22. Since the comminuting zone 34 has a larger radius than the crushing disk 22, there is a gap 32 between the walls 29 of the expanded portion 28 and the disk 22. As can be seen in FIG. 1, if a bottle enters the feed chamber 14 from the top, the only exit route is around the outer edge 35 of the crushing disk 22. Therefore, only fragments of glass that can fit between both an upper gap 33 between the surface 27 and the top of the cross bars 26, and the lower gap 32 between the outer edge 35 of the crushing disk 22 and the side walls 29 of expanded portion 28 will be able to exit the feed chamber 14. Any larger fragments will remain in the comminuting zone 34 to be further crushed.

Powering the crushing disk 22 is a motor 36, preferably below the disk 22 and directly connected by a shaft 38, although other linkages are possible. The disk includes a collar 37 and a retention screw 39 for attachment to the shaft. Mounted below the disk 22, preferably attached to the lower surface of the disk 22 and the outer edge of the collar 37, are a plurality of fan blades 40. These blades 40 spin with the crushing disk 22 and create a downward flow of air from the feed chamber 14 past the disk 22 and into the area below the disk 22, which is an exit chamber 42 (FIG. 3). The exit chamber 42 then extends horizontally into an outlet pipe 43 that eventually leads to a fragment spout 44, where fully crushed fragments are ejected from the crusher 10 (FIG. 1). Extending off of the outlet pipe 43 is an air outlet vent 46, having a dust filter bag 48 attached to the vent 46 on the exterior the pipe 43. The bag is formed of a fine filtering material that allows air to be expelled, but not glass dust. By the air currents created by the fan blades 40, glass dust is pulled downward out of the feed chamber 14, into the exit chamber 42 and out the vent 46.

The dust might remain in the filter bag 48 while the crusher 10 is on, but some will fall into a non-permeable fragment bag 50 attached to the fragment spout 44. Once the fragment bag 50 is inflated by the fan, the air from the exit chamber 42 will flow out the vent 46. Moreover, only dust will be carried out the vent 46 because the glass fragments are too heavy to be carried upward through vent 46 and instead will fall through spout 44 into the fragment bag 50. It is advantageous that the fragment bag 50 remains inflated during crushing to prevent abrasion of the sides of the bag 50 by the falling fragments. Once the crusher 10 is turned off, any dust fragments remaining in the filter bag 48 will automatically drop into the fragment bag 50 or the bag 48 can be shaken to facilitate this action. The vent 46 is preferably sized to alternatively receive a standard shop vacuum tube (not shown) that aids in gathering dust before it exits the fragment spout 44. The airflow created by the fan blades 40 also causes liquid that may have remained in a bottle to be ejected into fragment bag 50 or quickly evaporated.

The construction and positioning of the crushing disk 22 creates significant advantages over known crushing machines. The set of beater bars 24 that extend upward tend to "pre-crush" the bottles through two actions. First, by being positioned at the bottom of a spacious feed chamber 14, some bottles will enter the chamber 14 and fall unhampered directly on to the tops 52 of the beater bars 24, showering the disk 22 and cross bars 26 below with large size fragments. Thus, the force of gravity is added to any force provided by the spinning disk 22 to increase the effect of the initial shattering. Second, should a bottle not hit the top surface of the beater bars 24 as it falls down the chamber, the long side surfaces 54 of the beater bars 24 will hit the bottle, shattering it.

Figure 2:
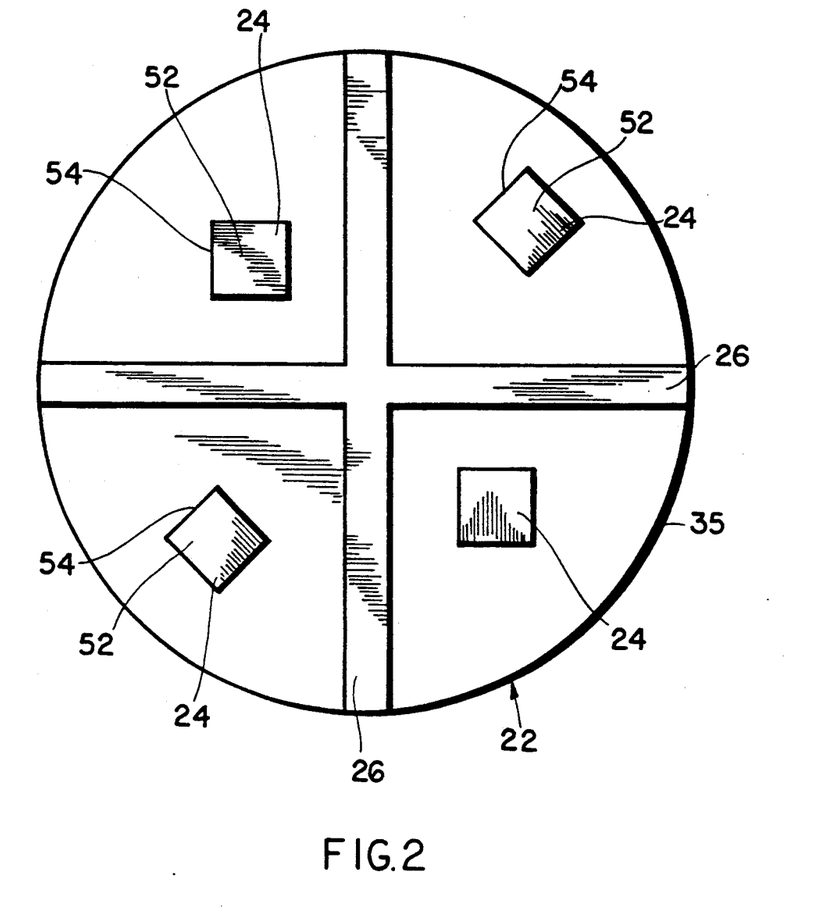
FIG. 2 is a top view of a crusher disk according to the invention.

As seen in FIG. 2, the beater bars have different orientations and are at different distances from the axis of rotation so as to spread the area of potential contact with falling bottles. Due to the high rotation rate of the disk 22 and the location of the beater bars 24, there is reasonable assurance that a beater bar 24 will hit a bottle as it falls through the pre-comminuting area 13 before it can reach the disk 22 and cross bars 26 below. Because the glass fragments will be shattered at high speed within the feed chamber 14, the diaphragm 16 prevents fragments from leaving the chamber 14 through the inlet 12.

Adjusting the size of fragments that are produced by the crusher 10 is accomplished in two ways. Initially, in the construction of the crusher 10, the lower gap 32 between the side walls 29 and the outer edge 35 of the disk 22 is set by their respective sizes. The size of this gap 32 can not be altered unless the disk 22 or chamber 14 is altered, so the gap 32 dictates the maximum size fragment that will be able to exit the feed chamber. A change in the size of the chamber may be affected by fastening a metal or other hard material band 41 (shown in dotted line in FIG. 3) in the chamber adjacent the outer edge 35 of the disk so as to reduce the size of gap 32.

It is possible that fragments can avoid the lower gap 32 by moving into the pipe 43 at position A (FIG. 3), although the upper gap 33 is unavoidable. If desired, the outlet pipe 43 can be made narrower or with a narrowed entrance (shown in dotted line), so as to provide gap 32 completely around the disk 32.

The upper gap 33 between the top 56 of the cross bars 26 and the upper interior surface 27 of the expanded portion 28 is set by their relative position during mounting on the motor's shaft 38. This gap 34 can be easily altered by simply loosening the mounting screw 39 and altering the relative position of the disk 22, collar 37 and shaft 38. Of course, if this upper gap 34 is larger than the lower gap 32, larger fragments will after the pipe 43 at possission A. However, by making the upper gap 34 smaller than the lower gap 32, the size of the fragments exiting the crusher 10 through the spout 44 can be reduced according to any specific desires of the operator. For known recycling operations, the preferred fragment size is a ¼" width or diameter.

Obviously, other known ways of adjusting the size of gap 32 can be used besides a screw. Also, access to the interior of the crusher 10 can be gained through the feed chamber 14 by removing the upper rubber portion 18 of the chamber 14, followed by removal of the portion 20, exposing the crushing disk 22 and any adjustment mechanism.

With the configuration of the preferred embodiment, there is essentially only one moving part besides the motor 36—the crushing disk 22. The fan blades 40 are mounted to the disk 22 and both sets of crushing elements 24,26 are mounted on the disk 22. Thus, there is reduced risk of failure or other maintenance problems. Repair of the disk 22 is easily affected by simply removing the disk on site and replacing it.

Figure 4:
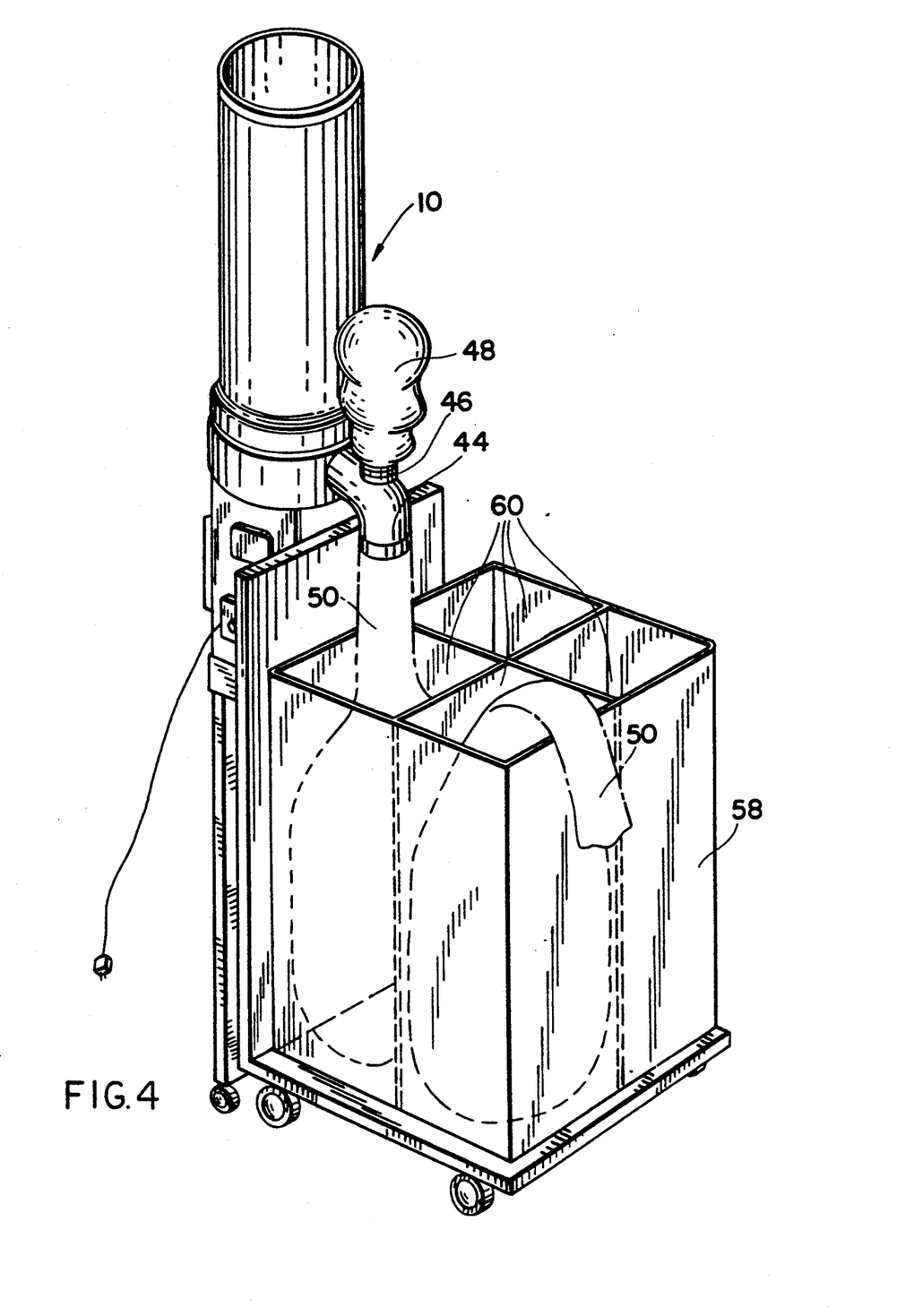
FIG. 4 is a perspective view of a bottle crusher and glass fragment collector.
Figure 5:
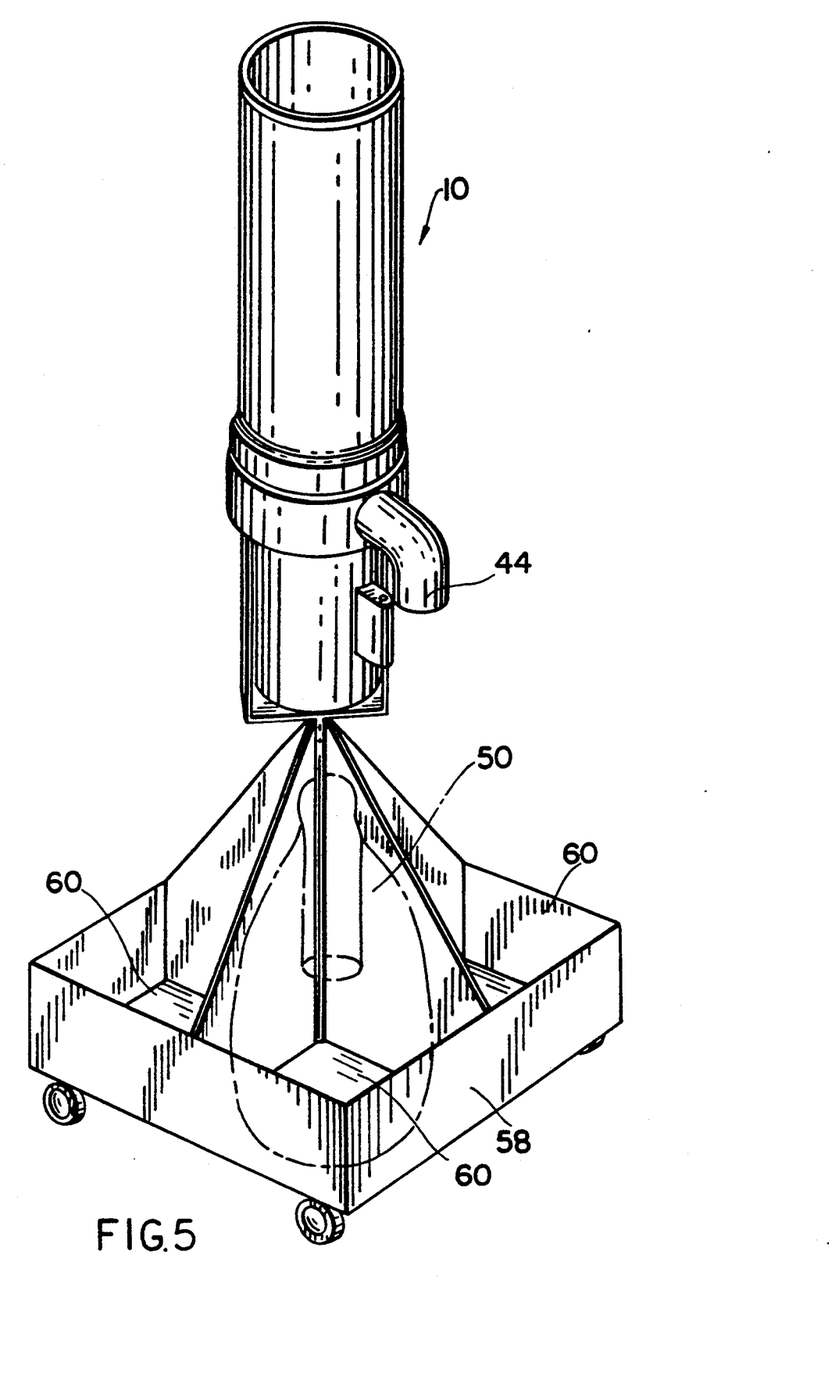
FIG. 5 is a perspective view of a bottle crusher and an alternate glass fragment collector.

It is also known that there are different colors of glass. Recycling mixed colors of glass is undesirable, so it is necessary to divide the separate colors of glass. This is accomplished by storing bottles of different color glass in different bins. Then only bottles of one color at a time are fed through the crusher 10. As they exit the crusher 10, the fragments of one color are directed into a particular bin 60 of a segmented collector 58 (FIG. 4). Depending on which color glass is being fed into the crusher 10, a fragment bag 50 situated in the appropriate bin 60 having the same color glass can be attached to the fragment spout 44. This collector 58 preferably rides on casters for rotation and transportation of the bags 50 at will. Alternatively, the crusher 10 can be mounted on top of the collector 58 at its center and rotated to dispense fragments into the proper bins 60, as shown in FIG. 5.

It is also preferred that the fragment bags 50 be transparent so that an operator can mount the proper bag having fragments matching the color of the next bottle to be crushed. Preferably, the bags are clear plastic, at least 5 mils thick, and sized such that when full, they can be hand-carried to a disposal site. This size is preferably 12" wide and 30" high. Since the bags are plastic, they can be easily sealed to prevent the release of odors, which might attract insects. This is particularly important when the bags must be stored before pickup or disposal.

Figure 6:
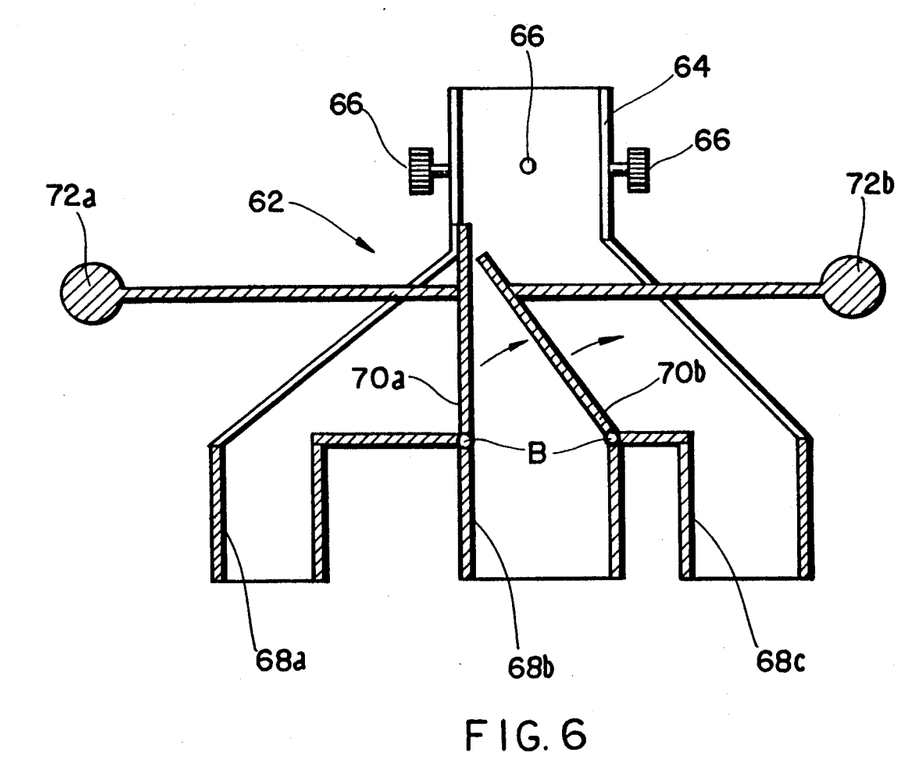
FIG. 6 is a cross-sectional view of a glass sorter according to the invention.

FIG. 6, a glass color sorter 62 is shown that can be attached to spout 44 at its inlet pipe 64 with bolts 66 or other attachment means. The sorter preferably has three exit spouts 68a, 68b, 68c onto which three fragment collecting bags 50 can be attached, respectively. The sorter 62 includes selection doors 70a, 70b for directing the glass to a particular spout, the doors 70a, 70b being pivoted at points B. Actuating rods 72a, 72b are attached to the doors 70a, 70b, respectively, and penetrate the walls of the sorter 62 for moving doors 70a, 70b.

In operation, as shown in FIG. 6, door 70b has been pivoted to abut door 70a. It can be seen that any glass fragments entering the inlet pipe 64 will exit the sorter 62 through exit spout 68c. Similarly, if rod 72b were moved in the direction of the arrow to the right in FIG. 6, door 70b would return to a vertical position and glass fragments would only flow through exit spout 68b. Likewise, actuation of rod 72a to the right would cause door 70a to move in the direction of the arrow so fragments flow through exit spout 68a.

While the embodiments of the invention shown and described are fully capable of achieving the results desired, it is to be understood that these embodiments have been shown and described for purposes of illustration only and not for purposes of limitation.

What is claimed is:

1. A bottle crushing device for crushing bottles into small fragments, comprising:
    a feed chamber having a first portion and a second portion below said first portion;
    a crushing disk rotatably mounted within said second portion such that a first gap exists between the outer edge of the disk and said second portion;
    at least one beater bar mounted normal to a first surface of said disk and extending into said first portion;
    at least one elongated cross bar mounted parallel to said first surface of said disk; and
    an exit chamber below said disk for receiving glass fragments only after said fragments have passed through said first gap.

2. A bottle crusher as in claim 1, where said feed chamber further comprises an inlet communicating with said first portion and positioned away from said second portion, said inlet having a diaphragm for preventing fragments from leaving the chamber through said inlet.

3. A bottle crusher as in claim 2, wherein said diaphragm comprises a plurality of flaps hinged within the feed chamber about the inlet and resiliently biased toward each other so as to normally close the inlet, but being moved against the bias by the force of a bottle entering the inlet.

4. A bottle crusher as in claim 1, wherein said first portion is formed of rubber to reduce operating noise of the bottle crusher.

5. A bottle crusher as in claim 1, wherein said second portion has a larger radius than said first portion, said disk being mounted on a shaft within said second portion such that the position of said disk may be varied with respect to an upper surface of said second portion, thereby varying the distance between said cross bar and said upper surface, whereby the size of particles exiting the feed chamber is controlled.

6. A bottle crusher as in claim 5, further including a band in the feed chamber adjacent the outer edges of the disk, whereby the size of particles existing the feed chamber is controlled by the thickness of the band.

7. A bottle crusher as in claim 1, further comprising fan blades connected to said disk within said exit chamber, said blades creating airflow from said feed chamber to said exit chamber when said disk is rotated.

8. A bottle crusher as in claim 7, further comprising a fragment collection bag in communication with said exit chamber, said bag being inflated by said airflow.

9. A bottle crusher as in claim 8 wherein said blades are mounted on a second surface of said disk, said second surface being opposite said first surface.

10. A bottle crusher as in claim 1 further comprising an outlet pipe communicating with and extending from said exit chamber, said pipe receiving said fragments from said exit chamber.

11. A bottle crusher as in claim 10 further comprising an air outlet vent extending upwardly from said outlet pipe, said vent having a dust filter bag attached thereto, said bag being formed of a mesh material.

12. A bottle crusher as in claim 1 wherein said cross bars have a length equal to the diameter of said disk.

13. A bottle crusher as in claim 1 further comprising:
    a spout extending downwardly from the exit chamber; and
    a collector with a plurality of bins, said collector being mounted on casters such that various ones of said bins can be positioned beneath the spout.

14. A bottle crusher as in claim 13, wherein said bottle crusher is pivotably mounted on said collector such that the exit chamber and spout can be rotated over various ones of said bins.

15. A bottle crusher as in claim 1, further including:
a spout extending downwardly from the exit chamber; and
a sorter with an entrance attached to the spout, a plurality of outlets, and control doors located within the sorter for directing fragments entering the entrance to various ones of said outlets.

16. A bottle crushing disk for crushing bottles impinging thereupon in an axial direction into small fragments, comprising:
a circular disk base having a pair of opposing surfaces;
an elongated beater bar mounted normal to one of said surfaces of said disk;
an elongated cross bar having an axial height less than that of said beater bar, said cross bar mounted parallel to said surfaces, such that said bottle will be engaged first by said beater bar and subsequently by said cross bar;
wherein said cross bar extends across a diameter of said disk; and
fan blades mounted on the other of said surfaces, said blades creating airflow generally from said one of said surfaces toward said other of said surfaces when said disk is rotated about its axis.

17. A device for comminuting glass articles into glass fragments and sorting said fragments, comprising:
a fragment collector having a plurality of bins positioned around a vertical axis; and
an article crusher rotatably mounted on top of said collector, substantially coaxial with said axis, said crusher comprising:
a feed chamber having a substantially vertical axis;
a crushing disk rotatably and coaxially mounted within said feed chamber;
an exit chamber attached to said feed chamber, said exit chamber mounted below said crushing disk, said crushing disk adapted such that only fragments smaller than a predetermined size will be able to pass into said exit chamber;
an exit spout communicating with said exit chamber and spaced from said vertical axis, such that when said crusher is rotated, glass fragments will exit said spout into a selected one of said plurality of bins.

* * * * *